May 12, 1925.
W. H. BANKS
CHILD'S VEHICLE
Filed Jan. 2, 1924
1,537,729
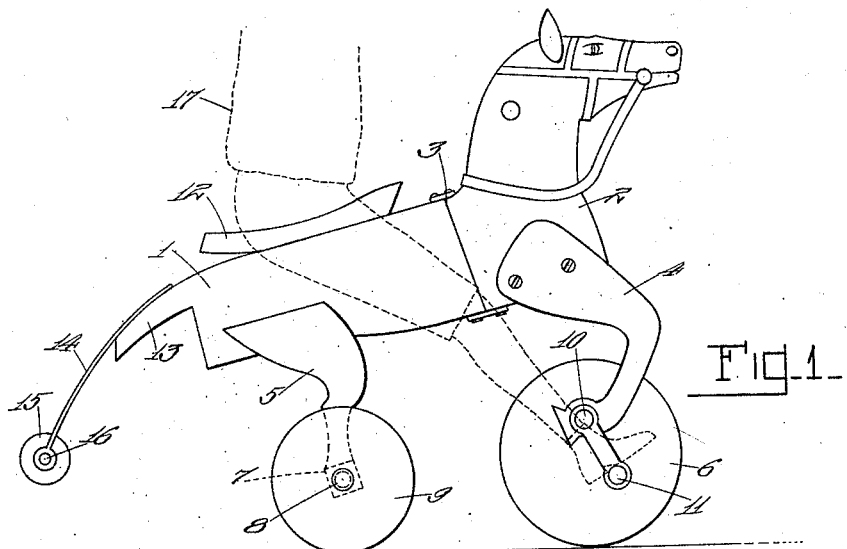
Fig. 1.
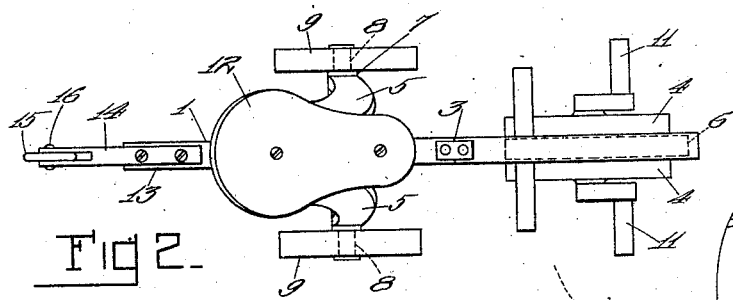
Fig. 2.
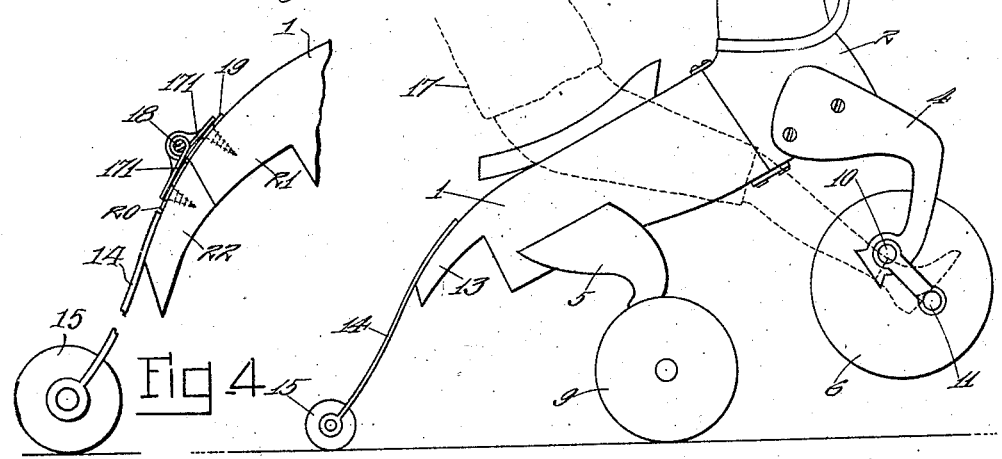
Fig. 4.
Fig. 3.
INVENTOR:
William H. Banks
By Macleod, Calver, Copeland & Dike
Attys.

Patented May 12, 1925.

1,537,729

UNITED STATES PATENT OFFICE.

WILLIAM H. BANKS, OF WINTHROP, MASSACHUSETTS.

CHILD'S VEHICLE.

Application filed January 2, 1924. Serial No. 683,860.

*To all whom it may concern:*

Be it known that I, WILLIAM H. BANKS, a citizen of the United States, residing at Winthrop, county of Suffolk, State of Massachuetts, have invented a certain new and useful Improvement in Children's Vehicles, of which the following is a specification, reference being had therein to the accompanying drawings.

The invention relates to a new and useful improvement in children's vehicles. The object of the invention is to provide a figure of a horse mounted on wheels with means whereby the rider may, at will, cause it to imitate the action of a bucking horse.

The invention will be fully understood from the following description when taken in connection with the accompanying drawings, and the novel features thereof will be pointed out and clearly defined in the claims at the close of this specification.

In the drawings:

Fig. 1 is a side elevation of a vehicle constructed in accordance with the invention.

Fig. 2 is a plan view of the device shown in Fig. 1.

Fig. 3 is a side elevation showing the vehicle tipped backward with his fore feet and attached driving wheels lifted entirely from the floor in imitation of a bucking horse.

Fig. 4 is a fragmentary view showing a modified form of a resilient tail.

Referring now to the drawings, 1 represents the figure of a horse, the figure having a fore part 2 which preferably has a hinged connection 3 with the rear portion so that the forepart may be turned with relation to the rear portion, if desired, to steer the vehicle. The figure has forward leg members 4, 4, and rear leg members 5, 5. The forward leg members 4 are eccentrically connected with a forward wheel 6 which is the driving wheel, and the rear leg members 5 are mounted upon a cross bar 7 having journals or trunnions 8, 8, on which the rear wheels 9, 9, turn. Preferably, the body portion is rigidly connected with the rear leg members.

The two forward legs 4, 4, straddle the forward wheel 6 and a shaft 10 passes eccentrically through said wheel and through the lower part of the forward leg members 4. The wheel 6 is fast on the shaft so that the wheel revolves therewith, but the shaft passes through the leg members 4, 4, and is journalled therein. The end portions of the shaft 10 project some distance beyond the outer faces of the portions of the leg members with which they are connected and have mounted thereon the pedal members 11, 11. It is obvious that when the pedals are operated so as to rotate the shaft 10, the driving wheel 6 will be rotated and, by reason of the eccentric connection of the shaft 10 with the wheel 6, the forepart of the horse will rise and fall and the rear wheels 9 will rotate. A seat 12 is mounted on the rear part of the body portion, preferably extending somewhat back of a vertical line through the axis of the trunnions 8, 8, on which the rear wheels are mounted.

The figure is provided with a tail member 13 having an extension spring portion 14 preferably carrying at its end a wheel 15 having a journal connection 16 with the said spring 14. This spring extends in a somewhat downward direction rearwardly, but is not of sufficient length to normally reach the ground or floor on which the vehicle stands. Preferably, when the vehicle is in its normal position with the forward and rear wheels both resting on the floor, ground or other bottom support, the wheel 15 connected with the spring extension of the tail will be elevated at some distance above the floor. As shown in the drawings, it is about the same elevation as the axis of the rear wheels.

At 17 is shown in dotted lines the representation of a child astride the figure and the seat 12. In Fig. 1 he is shown sitting upright, as in the ordinary position of riding. He can propel the vehicle with his feet by means of the pedals 11 after the manner common in velocipedes and, as long as he continues sitting in this normal position or with his body bent forward, the forward part of the figure will rise and fall after the manner of a galloping horse, while the pedals are being operated to propel the figure. If the rider bends his body somewhat backward, as shown in Figure 3, he will thereby throw the centre of gravity back of the rear axle or trunnions 8, thereby causing the forward part of the figure and the forward wheels to bodily tip upward, and the rear part will tip downward until the wheel 15 carried at the end of the tail spring 14 strikes the ground or floor, as shown in Fig. 3, which will serve as a stop to prevent the figure from entirely tipping over backwards. The spring 14 will become flexed by the force of striking the floor, thereby being put under tension, and every time the rider bends his body forward again so as to throw the centre of gravity forward of the rear wheels, the forepart will come down again onto the ground and the tension of the spring 14 will accelerate its return. It will thus be seen that the rider can easily, by slight movement of his body backward and forward, give the aforesaid bucking movement to the figure somewhat in imitation of the movement of the bucking of a live horse.

In the modification shown in Fig. 4, the resiliency of the tail is obtained by means of a spring hinge having a spring 171 coiled around the pintle 18. The two leaves 19, 20, of the hinge are connected, respectively, with the two sections 21, 22, of the tail.

While I have shown the figure of the device as fashioned in imitation of a horse so that it will appear more life-like, it is obvious that the figure may be fashioned to represent any animal or any inanimate object and still provide the peculiar mechanical action. It is preferred, however, to have the figure made in the form of a horse, as the horse is more commonly associated with an animal which is to be ridden and which sometimes bucks with its rider.

What I claim is—

1. A child's vehicle having a body portion front and rear leg members and wheels on which said leg members are mounted, means whereby the rider seated on the body portion may propel the vehicle, and a rearwardly extending resilient member normally raised slightly above the level of the surface on which the vehicle is being propelled.

2. A child's vehicle having a figure with a body portion and front and rear leg members and wheels on which said leg members are mounted, means whereby the rider seated on the body portion may propel the vehicle, a rearwardly extending resilient member normally raised slightly above the level of the surface on which the vehicle is being propelled, the body portion being capable of being tipped somewhat backward at will by the rider until the said resilient member comes in contact with the surface on which the vehicle is being propelled, the body portion being adapted to be tipped forward again so that the forward wheels will rest on the surface by the shifting of the position of the body of the rider.

In testimony whereof I affix my signature.

WILLIAM H. BANKS.